US008087617B2

(12) United States Patent
Sclafani et al.

(10) Patent No.: US 8,087,617 B2
(45) Date of Patent: Jan. 3, 2012

(54) RETRACTABLE NACELLE CHINE

(75) Inventors: Anthony J. Sclafani, Alta Loma, CA (US); Christopher A. Konings, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 700 days.

(21) Appl. No.: 12/192,407

(22) Filed: Aug. 15, 2008

(65) Prior Publication Data

US 2010/0038492 A1 Feb. 18, 2010

(51) Int. Cl.
*B64C 23/06* (2006.01)

(52) U.S. Cl. ............ 244/204.1; 244/130; 244/198; 244/199.1

(58) Field of Classification Search ............ 244/198, 244/199.1, 199.2, 199.3, 199.4, 130, 201, 244/203, 204.1
See application file for complete search history.

(56) References Cited

U.S. PATENT DOCUMENTS

| | | | | |
|---|---|---|---|---|
| 3,410,502 A * | 11/1968 | Leadon et al. | ........ | 244/164 |
| 3,744,745 A * | 7/1973 | Kerker et al. | ........ | 244/199.1 |
| 4,540,143 A * | 9/1985 | Wang et al. | ........ | 244/130 |
| 4,685,643 A * | 8/1987 | Henderson et al. | ........ | 244/199.1 |
| 4,739,957 A * | 4/1988 | Vess et al. | ........ | 244/199.1 |
| 4,884,772 A * | 12/1989 | Kraft | ........ | 244/199.1 |
| 6,126,118 A * | 10/2000 | Fujino et al. | ........ | 244/130 |
| 6,152,404 A | 11/2000 | Flaig et al. | | |
| 6,499,952 B1 | 12/2002 | Jacot et al. | | |
| 6,634,594 B1 * | 10/2003 | Bowcutt | ........ | 244/35 A |
| 6,718,752 B2 | 4/2004 | Nesbitt et al. | | |
| 6,964,397 B2 * | 11/2005 | Konings | ........ | 244/199.1 |
| 7,037,076 B2 | 5/2006 | Jacot et al. | | |
| 7,226,015 B1 * | 6/2007 | Prince et al. | ........ | 244/198 |
| 7,866,608 B2 * | 1/2011 | Atinault | ........ | 244/199.1 |
| 7,878,457 B2 * | 2/2011 | Narramore | ........ | 244/204.1 |
| 2005/0198777 A1 | 9/2005 | Mabe | | |
| 2010/0176249 A1 * | 7/2010 | Schwetzler | ........ | 244/199.1 |

* cited by examiner

*Primary Examiner* — Joshua Michener
*Assistant Examiner* — Steven Hawk
(74) *Attorney, Agent, or Firm* — Novatech IP Law; Sean O'Neill; Euclid Woo

(57) ABSTRACT

A retractable chine assembly includes at least one chine which is hingebly mountable to a surface such as of an aircraft having a wing. The chine is preferably configured to be movable between stowed and deployed positions. The aircraft may include an engine nacelle which may be mounted on an underside of the wing. The nacelle may generate a nacelle wake that passes over the wing upper surface at high angles of attack and induces flow separation. The chine is preferably configured such that a vortex generated thereby interacts which the nacelle wake to delay flow separation and stall.

18 Claims, 7 Drawing Sheets

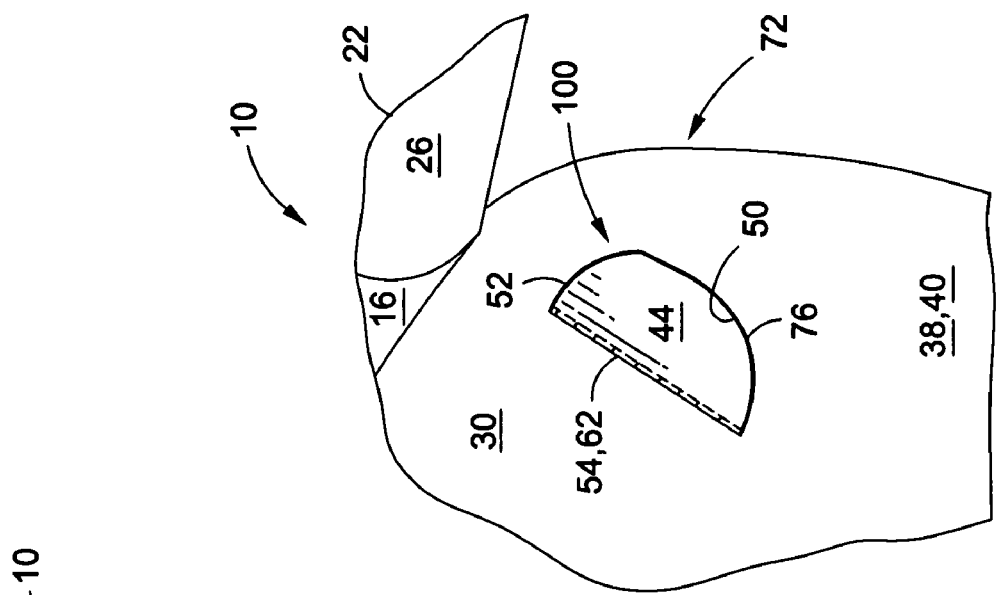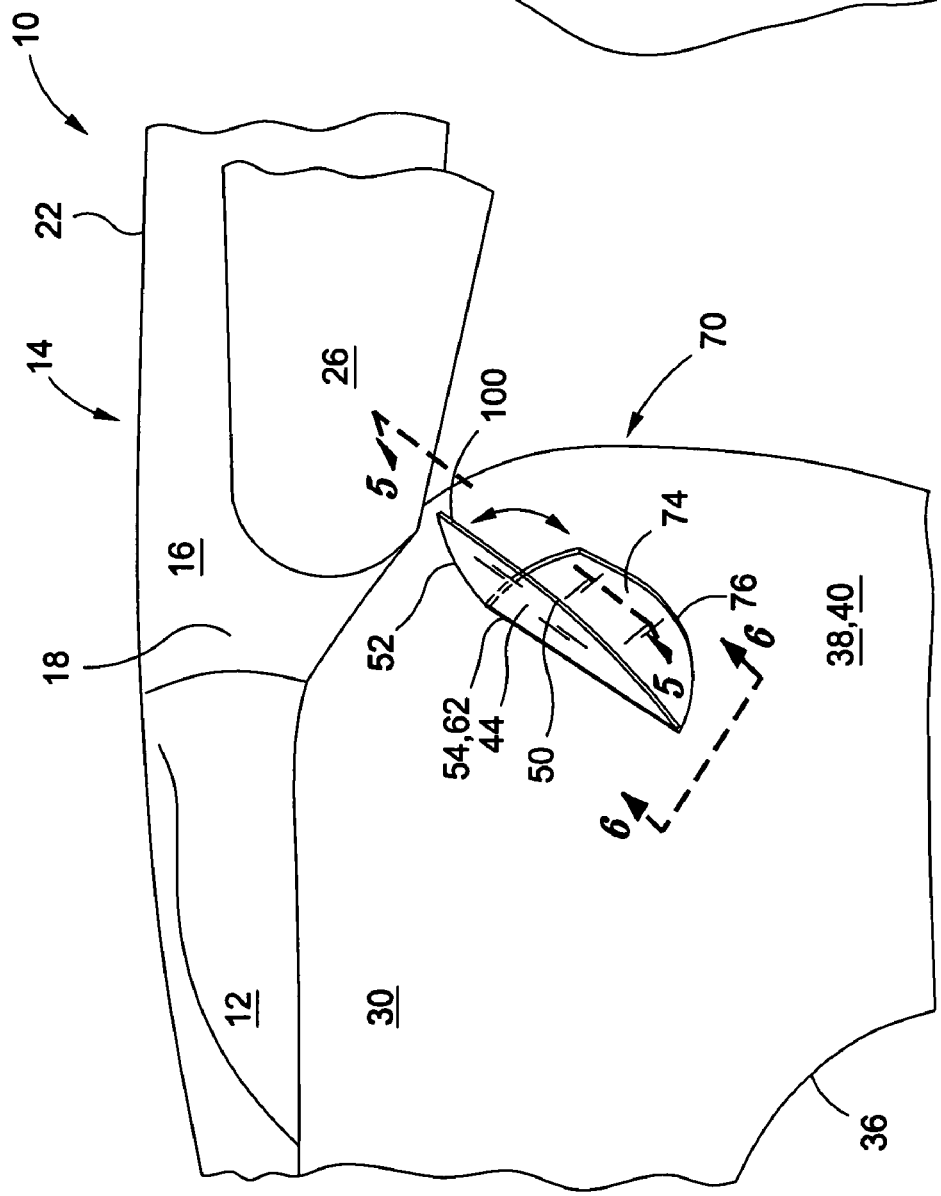

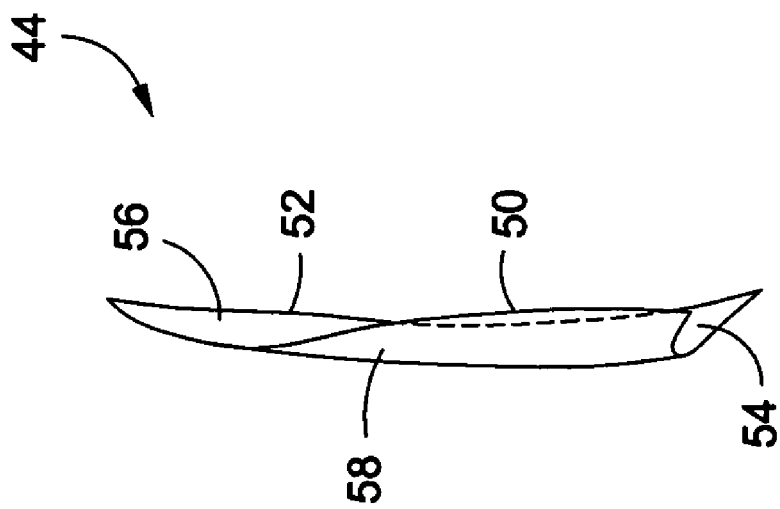
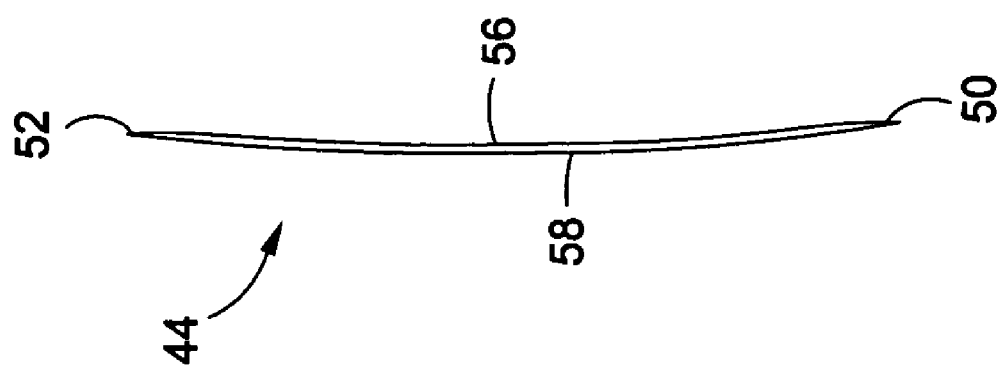

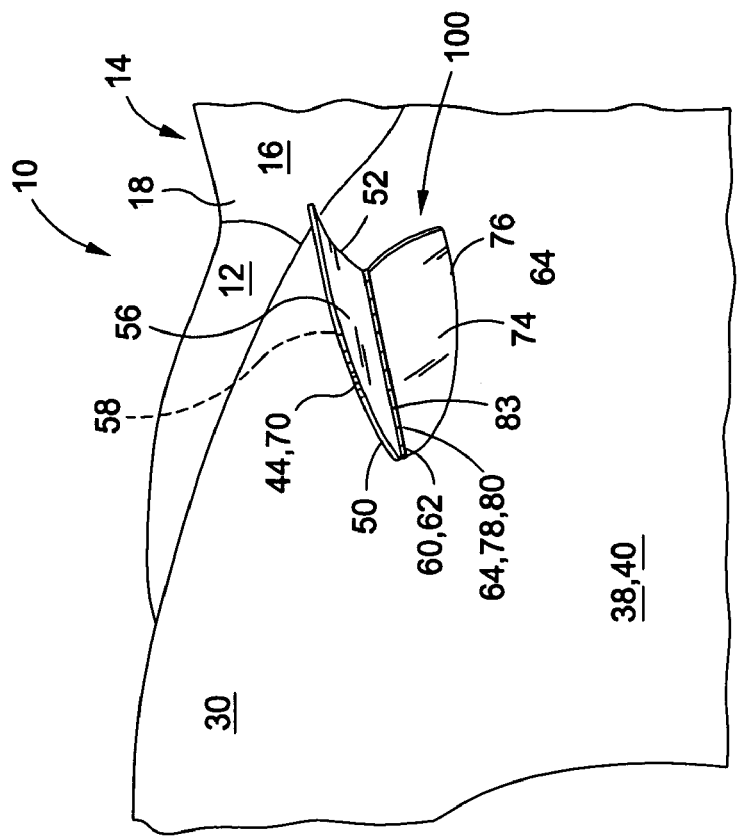
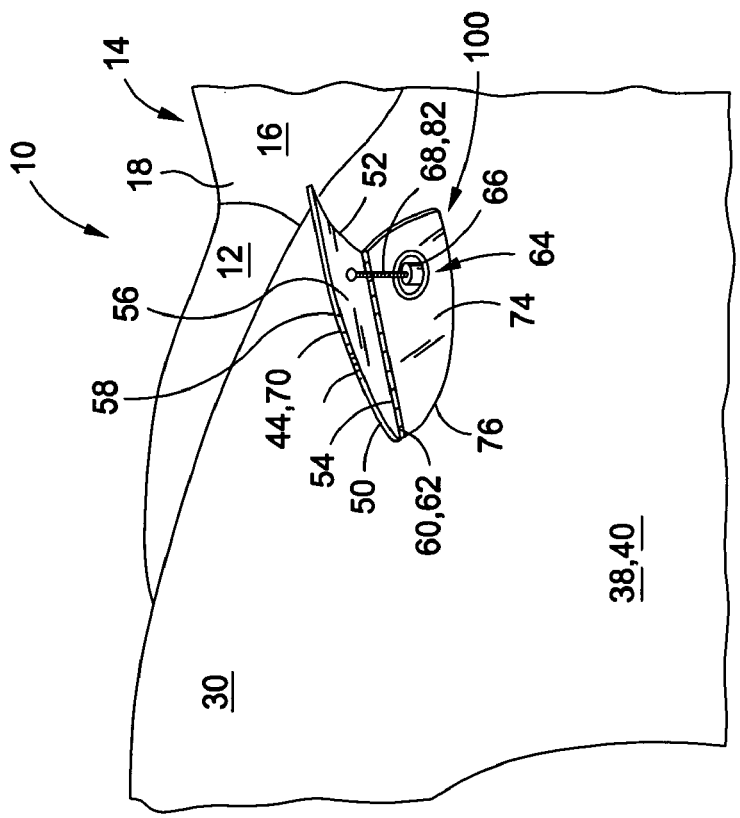

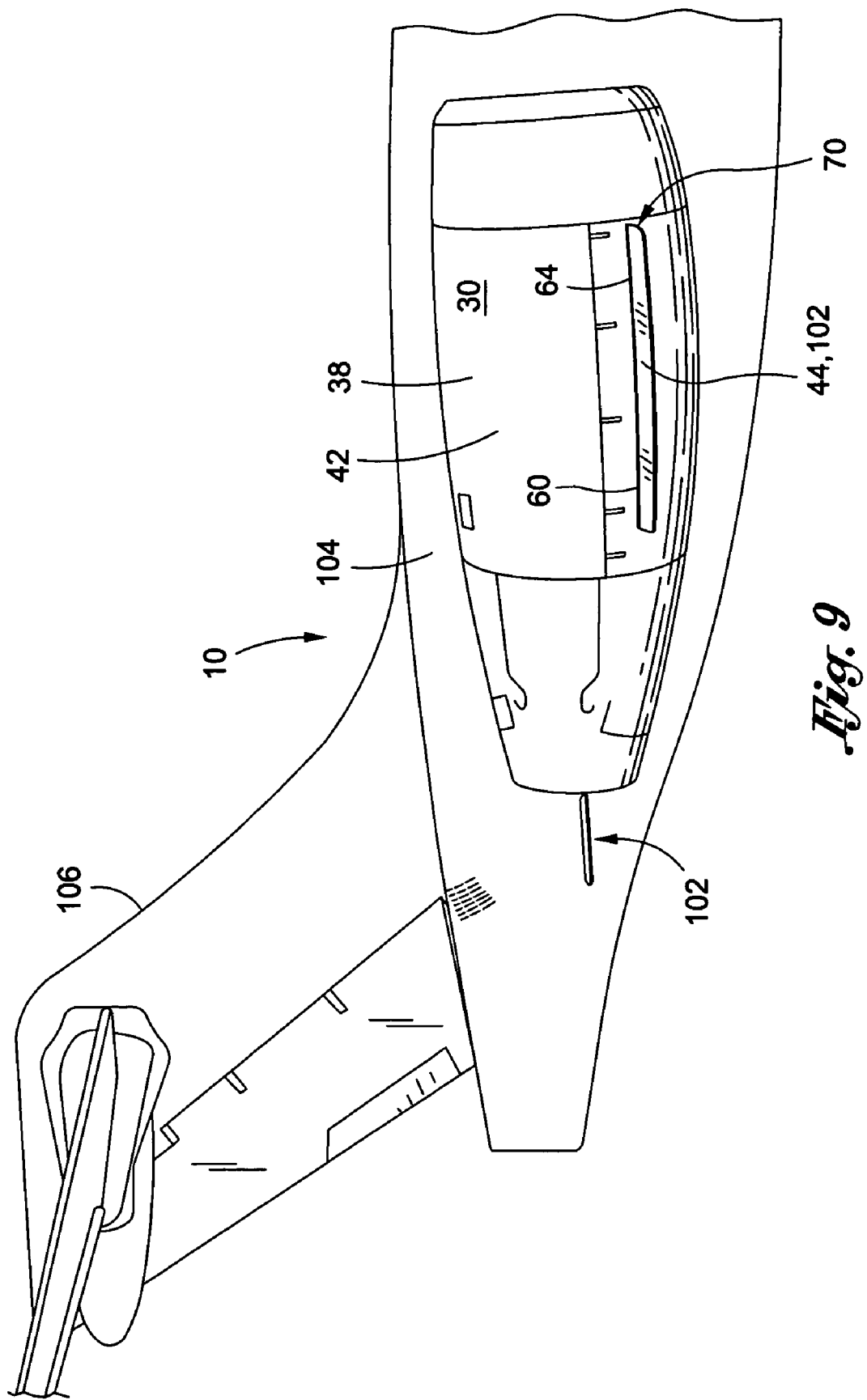

RETRACTABLE NACELLE CHINE

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to aerodynamic control devices and, more particularly, to an aerodynamic device such as a chine assembly that may be configured to delay flow separation induced by a wake generated by an engine nacelle at high angles of attack.

BACKGROUND

On certain aircraft such as commercial airliners, tankers, airlifters and transport aircraft, aircraft engines are typically mounted in nacelles that extend from pylons under the wing. In many aircraft, the leading edge of the engine nacelle is positioned forward of the wing leading edge. At high angles of attack, the engine nacelle sheds a wake. For aircraft where the engine nacelles are spaced at a relatively large distance from the wing, the wake generated may pass underneath the wing.

However, for installations where the engine nacelle is mounted in close proximity to the wing, the nacelle wake may flow over the wing leading edge and along the upper wing surface. Although the nacelle wake can be aerodynamically favorable under certain flight conditions, at high angles of attack close to the stalling angle where maximum lift is typically achieved, the nacelle wake can cause flow separation along the upper surface of the wing. Such flow separation may result in a reduction in the amount of lift that is producible by the wing in comparison to what might be achievable absent the nacelle wake.

Aircraft manufacturers have addressed the above-described flow separation phenomenon by installing various vortex-generating devices such as chines on the outer surface of the engine nacelle. The nacelle chine is typically mounted on a side of the engine nacelle and is sized and positioned to control the separation of the nacelle wake by generating a vortex that interacts beneficially with the wing upper surface boundary layer in order to reduce flow separation.

Although effective in improving wing lift capacity at high angles of attack, nacelle chines as conventionally installed possess certain deficiencies which detract from their overall utility. For example, because conventional nacelle chines are fixed in place and because they extend outwardly into the air flow, they produce unwanted aerodynamic drag and can have an adverse impact on the operating efficiency of the aircraft during cruise, takeoff and landing.

A further deficiency associated with conventionally-mounted nacelle chines is related to community noise that is generated by an aircraft which may be especially noticeable during the landing portion of a flight. For example, because the nacelle chine increases drag, engine thrust must be increased accordingly in order to maintain the same approach path. As is well known, community noise is a significant concern among populated areas near an airport. Any increase in aerodynamic drag on an aircraft can increase the community noise around airports.

As can be seen, there exists a need in the art for a nacelle chine that is configured to generate a vortex at high angles of attack for favorably interacting with the wing upper surface boundary layer in order to delay stall. Furthermore, there exists a need in the art for a nacelle chine wherein the contribution to aerodynamic drag is either minimized or eliminated during low angle-of-attack portions of flight. Finally, there exists a need in the art for a nacelle chine that is simple in construction, low in cost and requiring minimal time for installation and maintenance.

BRIEF SUMMARY

The above-described needs associated with chines as provided in the prior art are specifically addressed and alleviated by the various embodiments disclosed herein which provide a retractable chine assembly for mounting on a surface of an aircraft. In one embodiment, the retractable chine assembly may be installed on an engine nacelle mounted underneath and forwardly of the leading edge of the wing.

In a broad sense, the retractable chine assembly may comprise at least one chine or other vortex generator which may be hingebly mountable to a surface of the aircraft. The chine is preferably configured to be movable between stowed and deployed positions. In one embodiment, the chine is disposable against the aircraft surface in the stowed position and preferably conforms to a contour of the aircraft surface. The chine is preferably sized, positioned and oriented in order to generate a vortex at high angles of attack such that the vortex may interact favorably with the flow field of the wing upper surface.

At high angles, the nacelle may generate a nacelle wake that passes over the wing upper surface and induces flow separation In this regard, the chine is preferably sized and positioned such that the vortex generated thereby interacts favorably with the nacelle wake in order to delay flow separation and thereby delay stall. The vortex produced by the chine thereby improves maximum lift capability by interacting with the boundary layer of the wing.

In one embodiment that may be adapted for use on rearwardly swept wings, the chine is preferably mountable on an inboard side of the engine nacelle. The engine nacelle may have a side surface which defines a contour. The nacelle is preferably contoured to substantially match the contour of the side surface of the engine nacelle when the chine is moved into the stowed position. In one embodiment, the engine nacelle may include a recess which is sized and configured to receive the chine therein. The chine may have inner and outer surfaces with the inner surface of the chine being configured to nest within the recess. The outer surface of the chine may be configured or contoured to provide continuity with the side surface of the engine nacelle to preserve the aerodynamics thereof.

The retractable chine assembly may further include an actuating mechanism of any suitable arrangement for moving the chine between the stowed and deployed positions. In one embodiment, the actuating mechanism may be configured to bias or move the chine into the deployed position such as via a compression spring arrangement and wherein the chine may be manually or automatically resettable into the stowed position after deployment such as upon returning to an airport.

The actuating mechanism may comprise any suitable actuating mechanism and may be configured with various actuating means including, but not limited to, hydraulic, pneumatic, and electromechanical actuators. In another embodiment, the actuating mechanism may comprise a shape memory alloy device which may extend at least partially along a root chord of the chine and which may coincide with a hinge line thereof. The shape memory alloy may comprise at least one torque tube which, when heated such as upon the application of electrical current, may cause the chine to move from the stowed position into the deployed position.

As was indicated above, the retractable chine is preferably installed such that when deployed, the chine is sized, configured and positioned similar to the size, configuration and position of fixed chines as known in the art. The technical effects of the disclosure include the ability to optimize the chine installation without compromising size, shape and position in an attempt to minimize the aerodynamic drag during various phases of flight. In this regard, the retractable chine provides the ability to optimize the size, shape, orientation, position and quantity of the chine for high lift conditions typically occurring at high angles of attack without extensive regard to the aerodynamic drag generated by the chine. As such, the chine assembly as disclosed herein may substantially improve the operating performance of an aircraft.

Performance improvements may include, without limitation, a reduction in fuel burn which may be an important factor for long-distance flights. Other performance improvements may include a reduction in the amount of noise in comparison to the amount of noise generated by aircraft having fixed chines and which may be the result of the higher power settings of the engines to overcome increased aerodynamic drag. Additional benefits may include an increase in the maximum coefficient of lift by increasing the size of the chine which may enable a reduction in approach speed.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is an enlarged perspective illustration of the chine assembly installed on an inboard side of the engine nacelle and wherein the chine is oriented in a deployed position;

FIG. 4 is a perspective illustration of the chine assembly in the stowed position wherein the chine is received within a recess formed in the engine nacelle;

FIG. 5 is a top view of the chine assembly illustrating a contour thereof preferably matching a contour of the engine nacelle;

FIG. 6 is a front view of the chine assembly illustrating a leading and trailing edge thereof and further illustrating a contour formed complementary to a contour of the engine nacelle;

FIG. 7 is a perspective illustration of the chine assembly illustrating an actuating mechanism extending outwardly from the recess;

FIG. 8 is a perspective illustration of the chine assembly illustrating the actuating mechanism configured as a shaped memory alloy device;

FIG. 9 is a perspective illustration of a further embodiment of a retractable strake or chine mounted on an aft-fuselage mounted engine nacelle and further illustrating a retractable strake mounted on a fuselage of an aircraft;

DETAILED DESCRIPTION

Figure 1:
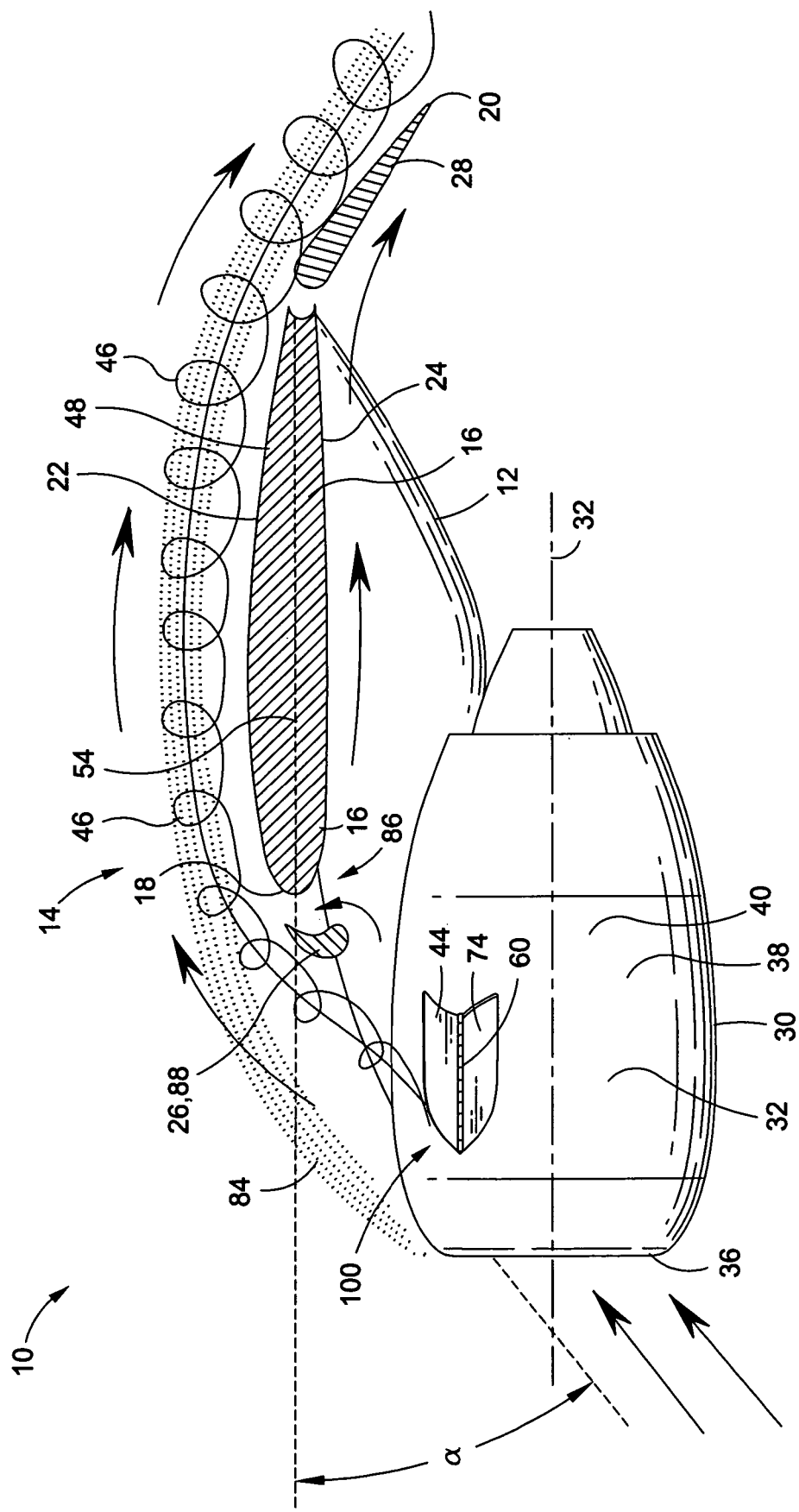
FIG. 1 is a side elevational illustration of an engine nacelle mounted on an underside of an aircraft wing and further illustrating a nacelle chine assembly configured to generate a vortex at high angles of attack.
Figure 2:
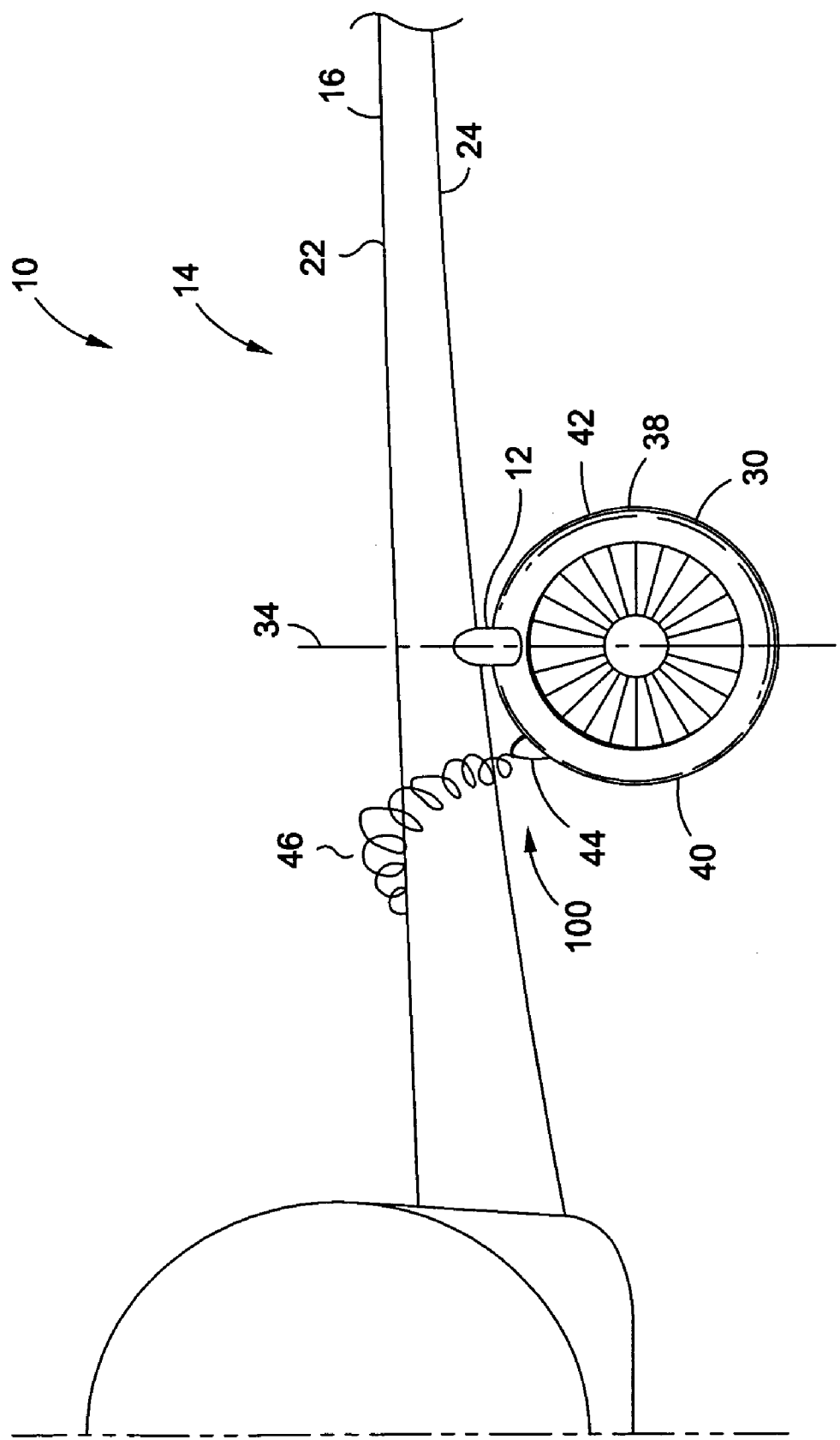
FIG. 2 is a front elevational illustration of the engine nacelle installed on an underside of the aircraft wing and illustrating the vortex generated by the nacelle chine assembly flowing over the upper surface of the wing.

Referring now to the drawings wherein the showings are for purposes of illustrating preferred embodiments of the disclosure and not for purposes of limiting the same, shown in FIGS. 1 and 2 is a retractable chine assembly such as may be installed on a vehicle such as an aircraft 10. The aircraft 10 may have a wing assembly 14 including a wing 16 having a wing upper surface 22 and a wing lower surface 24. The retractable chine assembly may comprise at least one vortex generator or other aerodynamic device such as a chine 44 which is preferably hingedly mountable on an aircraft 10 such as on an engine nacelle 30 of the aircraft 10.

The chine 44 is preferably sized, configured, positioned and/or oriented on the engine nacelle 30 in order to generate a vortex 46 which preferably passes over a wing upper surface 22 of the wing 16 in order to interact with a nacelle wake 84 that may be generated by the nacelle at high angles of attack $\alpha$. However, it is also contemplated that the chine 44 may be sized, configured, positioned and/or oriented to generate a vortex 46 that passes at least partially underneath the wing 16 at high angles of attack $\alpha$. Furthermore, any number of other aerodynamic devices may be provided with the retractable feature associated with the chine 44. In addition, as described below, such aerodynamic devices may be applied to other areas of an aircraft and are not limited to underwing engine nacelle installations.

As is known in the art, nacelle wakes produced at high angles of attack may induce flow separation on a rearward portion of the wing upper surface 22 and may therefore limit the amount of lift that is achievable by the wing 16. The vortex 46 generated by the nacelle chine 44 is specifically adapted to delay flow separation and stall otherwise induced by the nacelle wake 84 and thereby improves maximum lift capability by interacting with a boundary layer 48 of the wing 16 upper surface.

In one embodiment, the retractable chine assembly may be installed on an aircraft 10 having an underwing mounted engine nacelle 30. Such engine nacelles may be disposed in close proximity to an underside of the wing 16 as is typically the case for high bypass ratio or turbofan engines. However, it is also contemplated that the retractable chine assembly as disclosed herein may be installed for use on aircraft 10 wherein the engine nacelle 30 is mounted at a large distance from the underside of the wing 16. In addition, the retractable chine assembly may be installed on an aft-fuselage mounted engine nacelle as shown in FIG. 9.

Furthermore, the retractable chine assembly may be installed on vehicles other than aircraft such as, without limitation, missiles and other projectiles, reentry vehicles, and any other vehicle applications wherein fixed chines or other vortex-generating devices are installed. In this regard, the retractable nature of the nacelle chine may be applied to any other type of aerodynamic device including, but not limited to, a retractable strake 102 such as a body strake that may be mounted on an aircraft 10 such as on the rear fuselage 104 adjacent the tail 106 of the aircraft 10 as illustrated in FIG. 9. In this regard, it is contemplated that the retractable nature of the chine 44 may be applied to strakes 102 that may be installed on other locations such as on a forward portion of the aircraft 10 fuselage 104. Other types of retractable aerodynamic devices to which the features of the present disclosure may be applied include wing fences (not shown), vortilons (not shown) and any type of vortex generator or other types of aerodynamic devices.

The retractable chine assembly is specifically adapted such that at high angles of attack α, the vortex 46 generated thereby passes over the leading edge 18 of the wing 16 and flows over the wing upper surface 22 and interacts with the nacelle wake 84 generated by the nacelle. The vortex 46 generated by the chine 44 interacts favorably with the nacelle wake 84 and may limit expansion of the flow separation induced by the nacelle wake 84. In this regard, the chine 44 maximizes lift of the wing 16 at high angles of attack α and delays flow separation.

Referring particularly to FIGS. 1 and 2, the vortex 46 which is produced by the retractable chine assembly may generate an optimum aerodynamic characteristic at stalling angles of attack α wherein maximum lift is typically achieved. For aircraft 10 having rearwardly swept wings 16, the retractable chine assembly is preferably mounted on an inboard side 40 of the engine nacelle 30 as can be seen in FIG. 2. It is also contemplated that the retractable chine assembly may be mounted on an outboard side 42 of the engine nacelle 30 as may be desirable for a forwardly swept wing 16 or to achieve other purposes. However, the chine 44 may be mountable on inboard and/or outboard sides of the engine nacelle 30 regardless of the sweep direction of the wings 16.

The retractable chine assembly as disclosed herein is preferably mountable on engine nacelle 30 installations where the nacelle is located forwardly and below the wing 16 and in close proximity thereto. The engine nacelle 30 may be mounted or suspended from the wing assembly 14 via a pylon 12 or other support member. The engine nacelle 30 may have a generally circular or rounded configuration having a nacelle lip 36 on a forward end of the nacelle and having a nacelle axis 32 extending through the center thereof and as shown in FIG. 1.

As best seen in FIG. 2, the retractable chine assembly is preferably mounted on the side surface 38 of the nacelle and, in one embodiment, may be mounted on an inboard side 40 thereof. FIG. 2 further illustrates a vertical axis 34 extending through a center of the engine nacelle 30. The chine 44 is preferably mounted on the side surface 38 of the nacelle at an angular location that is between approximately 0 degrees and 90 degrees from the vertical axis 34. However, it is also contemplated that the chine 44 may be mounted at any angular location relative to the vertical axis 34 and is not solely limited to a position between 0 and 90 degrees.

Furthermore, it is also contemplated that the chine 44 be mounted on an outboard side 42 of the engine nacelle 30 as may be desirable for a forwardly swept wing configuration. In addition, it is contemplated that chines may be mounted on both inboard and outboard sides 40, 42. Even further, it is contemplated that multiple chines may be mounted on both the inboard and/or outboard sides 40, 42 of the engine nacelle 30 as may be desirable for a certain set of flight operating parameters and/or wing/nacelle configurations.

Referring particularly to FIGS. 3 through 6, the chine 44 is preferably configured to be disposable against the aircraft surface when in a stowed position 72. In this regard, the chine 44 may be contoured to match the contour of the side surface 38 of the engine nacelle 30 when in the stowed position 72. In a further embodiment, the engine nacelle 30 may preferably, but optionally, include a recess 74 formed in the side surface 38 for receiving the chine 44 in the stowed position 72. The recess 74 may define a recess perimeter 76 that is sized complementary to a chine leading edge 50 and chine trailing edge 52 of the 44 such that a close fit is provided between the chine 44 and the recess perimeter 76.

As best seen in FIG. 3, the chine 44 is shown in the deployed position 70 wherein the chine 44 may be configured to extend outwardly from the engine nacelle 30. In this regard, the chine 44 may be configured to extend generally perpendicularly from the engine nacelle 30 or in a normal orientation relative to the local contour of the engine nacelle 30. However, it is also contemplated that the chine 44 may be configured to be deployed at a non-perpendicular orientation relative to the engine nacelle 30 when in the deployed position 70.

As can be seen in FIG. 4, the chine 44 may be disposable against the engine nacelle 30 in the stowed position 72. The chine 44 may be configured to lie flush with the side surface 38 of the engine nacelle 30 when in the stowed position 72 such that the chine 44 is received within the recess 74. In this regard, the engine nacelle 30 side surface 38 defines a contour and the chine 44 is preferably, but optionally, contoured to substantially match the contour of the side surface 38 of the engine nacelle 30 when the chine 44 is in the stowed position 72.

Shown in FIGS. 5 and 6 are top and rearward views, respectively, of the chine 44 where it can be seen that the chine 44 has a contoured or curved configuration. The chine 44 defines inner and outer surfaces 56, 58. At least the inner surface 56 of the chine 44 is preferably contoured to substantially match the contour of the side surface 38 of the engine nacelle 30 and/or the contour of the recess 74. In addition, the outer surface 58 of the chine 44 is preferably contoured to substantially match the contour of the side surface 38 of the engine nacelle 30 in order to prevent disruption of the aerodynamics thereof.

Referring to FIG. 7, shown is an actuating mechanism 64 which is configured to facilitate hinged or pivoting movement of the chine 44 between stowed and deployed positions. The chine 44 may be hingedly mounted to the engine nacelle 30 along a hinge line 62 of the chine 44. The chine 44 may include a hinge 60 such as a mechanical hinge (i.e., piano hinge, two-part hinge, etc.) disposed along the hinge line 62 at the root chord 54 of the chine 44 as shown in FIG. 7.

The actuating mechanism 64 may be installed within the recess and/or may extend from the confines of the recess 74 on the engine nacelle 30 although other locations of the actuating mechanism 64 are contemplated outside the recess 74. As can be seen, the actuating mechanism 64 may be integrated or embedded into a wall of the engine nacelle 30 and may extend upwardly from the recess 74.

The actuating mechanism 64 may be configured to operate in any one of a variety of different configurations and utilizing a variety of different mediums or combinations thereof. For example, the actuating mechanism 64 may be configured as a hydraulic actuator 66 or as a pneumatic and/or electromechanical actuator or any other suitable actuation means or combination thereof.

The actuating mechanism 64 as best seen in FIG. 7 may include an actuator arm 68 which may extend upwardly from the recess 74 and is operatively coupled to the chine 44 such as along the inner surface 56 thereof. However, it is contemplated that the actuating mechanism 64 may be operatively coupled to the chine 44 at any point along the chine 44 and is not solely limited to extending from the recess 74 and attaching to the inner surface 56 of the chine 44. For example, the actuating mechanism 64 may be operatively coupled to the chine leading and/or trailing edge 50, 52 or at any point along the chine 44.

Referring back to FIG. 8, shown is the actuating mechanism 64 configured as a shape memory alloy device 80. As was earlier mentioned, the chine 44 may be hingedly mounted to the engine nacelle 30 via the hinge 60 such as with a mechanical hinge (i.e., piano hinge, two spaced-apart hinges, etc.) disposed along the hinge line 62. In FIG. 8, the shape memory alloy device 80 may comprise a torque tube 78 that extends along the hinge line 62 which may be formed along a root chord 54 of the chine 44 from the chine leading edge 50 to the chine trailing edge 52.

In one embodiment, the shape memory alloy device 80 may comprise the torque tube 78 which, upon the application of heat, may cause the chine 44 to move from the stowed position 72 as illustrated in FIG. 4 into the deployed position 70 as illustrated in FIG. 8. Once moved to the deployed position 70, the chine 44 may be locked into position using a suitable lock mechanism (not shown). When returning the chine 44 from the deployed position 70 to the stowed position 72, the shape memory allow may be disengaged and allowed to cool.

A biasing mechanism or spring (not shown) such as a return spring may be activated after releasing the lock mechanism in order to allow the chine 44 to move from the deployed position 70 into the stowed position 72 as shown in FIG. 4. Advantageously, the shape memory alloy configuration of the actuating mechanism 64 provides a low profile actuating mechanism 64 which may be integrated into the hinge line 62 for activating the retractable chine assembly. It should be noted that the above-described shape memory alloy 80 actuating mechanism 64 is exemplary only and could comprise a variety of alternative configurations operating in a number of different ways.

As was indicated above, the actuating mechanism 64 may be configured to move the chine 44 between the stowed and deployed positions 72, 70. In this regard, the chine 44 is preferably configured to possess sufficient strength and rigidity or stiffness to resist any undesirable flexing under aerodynamic or static loading. In addition, the chine 44 may optionally be configured to be relatively thin in order to minimize aerodynamic drag. However, because the chine 44 may be retracted for a majority of the time, it may not be necessary to provide the chine 44 in a thin configuration.

The chine 44 is preferably configured to be deployable at certain flight conditions such as at high angles of attack α as shown in FIG. 1. In one embodiment, the chine 44 may be configured to be moved from the stowed position 72 to the deployed position 70 when the aircraft angle of attack α reaches a predetermined level. The level at which the chine 44 is deployed is preferably prior to the point at which flow separation occurs. In addition to or in combination with the chine 44 deployment at predetermined angles of attack α, the chine 44 may be configured to be movable from the stowed position 72 to the deployed position 70 when the leading edge device 26 is extended outwardly from the wing 16 by a predetermined amount.

In one embodiment, the chine 44 may be configured to be biased toward and is automatically activated into the deployed position 70. After deployment, the chine 44 may remain in the deployed position 70 until mechanically or manually reset to the stowed position 72 such that the chine 44 fits within the recess 74 of the engine nacelle 30. The above-described biasing of the chine 44 into the deployed position 70 may be desirable as such arrangement may simplify the actuation mechanism and may be further desirable in light of the relatively limited occurrences wherein an aircraft 10 reaches an angle of attack α where flow separation may occur and stall is imminent.

In this regard, the means for releasing the chine 44 from the stowed position 72 may comprise a latch or lock (not shown) which may be communicatively coupled to flight sensing information such as an angle of attack indicator for sensing the angle of attack α of the aircraft 10 or which may sense at least the local angle of attack α in an area affected by the nacelle wake 84. The chine 44 may be configured to be automatically released from the stowed position 72 upon a sensing that the angle of attack α has reached a predetermined level. Thereafter, upon landing, the chine 44 may be manually reset such as by delatching the chine 44 from the deployed position 70 and pushing the chine 44 into the stowed position 72 such as into the recess 74 where it may be again locked by an appropriate locking mechanism.

Referring briefly to FIG. 1, shown is an aircraft wing assembly 14 which may have any number of high lift devices disposed on at least one of the leading and trailing edge 18, 20 of the wing 16. As can be seen, the leading edge 18 of the wing 16 may include a slat 88 arrangement which is shown in FIG. 1 in the extended position. The extended slat 88 may form a slot 86 between the leading edge 18 of the wing 16 and an inner contour of the slat 88. When the slat 88 is extended such as during certain high lift conditions or when the aircraft 10 is approaching a high angle of attack α, air may flow through the slot 86 which may delay flow separation.

In one embodiment known as an "auto-slat" arrangement, the slat 88 may be automatically extended away from the wing 16 leading edge 18 such as at high angles of attack α. The actuating mechanism 64 of the chine 44 may be communicatively coupled to a slat actuation mechanism such that upon reaching an angle of attack α, the chine 44 may be moved to the deployed position 70 in conjunction with deployment of the slat 88. In such an "auto-slat" arrangement wherein the slot 86 opens due to outward movement of the slat 8, the deployed chine 44 may generate vortex 46 which may pass over the leading edge 18 of the wing 16 and interact with the flow field on the wing upper surface 22 in order to delay stall.

Referring still to FIG. 1, in a similar embodiment, the chine 44 may be configured to be moved from the stowed position 72 to the deployed position 70 following activation of a trailing edge device 28 such as the flap shown in a slotted arrangement. However, a more likely scenario would be the auto-slat configuration described above wherein the chine 44 may be automatically deployed upon opening of the slot 86 between the leading edge device 26 (i.e., slat 88) and the leading edge 18 of the wing 16.

Referring to FIG. 9, shown is a further embodiment of the retractable chine 44 installed on an aft-fuselage mounted engine nacelle 30. The chine 44 may be installed in a manner similar to that described above for the underwing nacelle 30 installations illustrated in FIGS. 1-8. The chine 44 shown in FIG. 9 may be configured to be deployed upon the occurrence of predetermined flight conditions. The chine 44 illustrated in FIG. 9 is shown in an elongate configuration which may be retractably disposed on an outboard side 42 of the engine nacelle 30 in order to provide aerodynamic benefits in relation to the T-tail 106 configuration shown. In further embodiments, the retractable nature of the nacelle chine 44 may be applied to other types of aerodynamic devices including, but not limited to, the retractable strake 102 shown in FIG. 9 as being mounted on the rear portion of fuselage 104 adjacent the tail 106 of the aircraft 10. In this regard, it is contemplated that the retractable nature of the chine 44 may be applied to strakes 102 that may be installed on any other location such as on a forward portion of the aircraft 10 fuselage 104.

Figure 10:
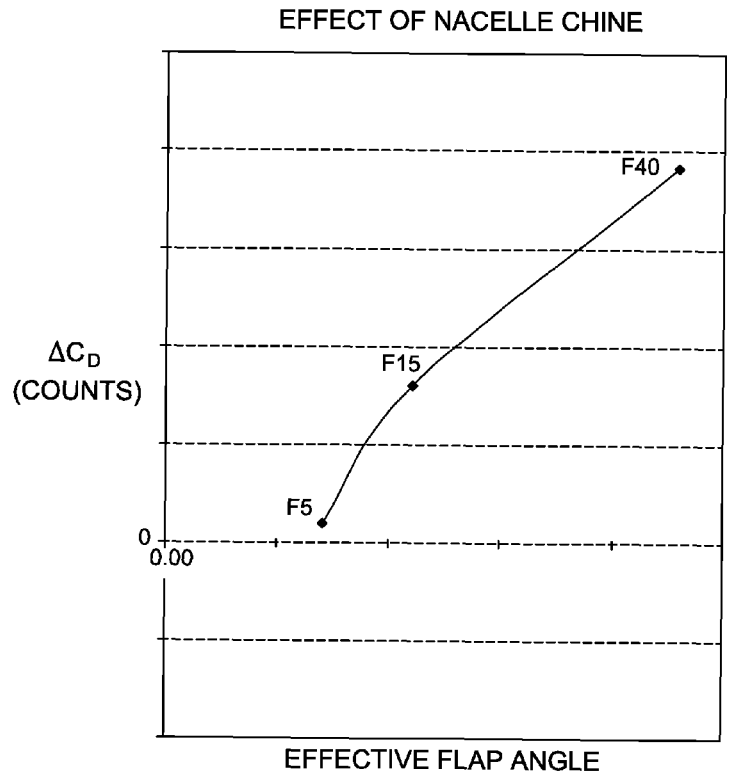
FIG. 10 is a graph illustrating the effects of the nacelle chine in a low-speed, flaps-down setting and illustrating aerodynamic drag plotted against effective flap angle.

Referring briefly to FIG. 10, shown is a graph illustrating the effects of a nacelle chine 44 in a non-cruise, low-speed, flaps-down setting. The graph of FIG. 10 plots aerodynamic drag against effective flap angle. FIG. 10 graphically illustrates drag impact at different flap settings at an operational angle of attack well below the stall angle. For example, for a flap detent setting of 5, the drag provided by the chine is at a relatively low level but increases generally linearly with increasing flap detent settings which correlate to greater effective flap angles. As such, it can be seen that for high flap detent settings, a relatively large amount of aerodynamic drag is produced by the chine 44. As was earlier mentioned, such drag increases engine thrust requirements which can contribute to noise generated by the aircraft 10.

In use, the chine 44 may be hingedly mounted to the side surface 38 of the engine nacelle 30 such as along an inboard side 40 of the engine nacelle 30 for aircraft 10 having rearwardly swept wings. However, as was described above, the chine 44 may be mounted on the inboard and/or outboard sides 40, 42 of the engine nacelle 30. The chine 44 may be positionable in a stowed position 72 wherein the chine 44 may fit within a recess 74 formed in the side surface 38 of the engine nacelle 30. Alternatively, it is contemplated that no recess 74 may be provided and the chine 44 may simply be disposed against an outer side surface 38 of the engine nacelle 30 preferably positionable in abutting contact therewith.

The chine 44 is preferably sized, shaped, positioned and oriented in accordance with an optimal size, shape, position and orientation of fixed chines as known in the art. However, because of its capability for stowing in the stowed position 72 when not in use, the chine 44 eliminates the need for compromise in the size, shape, position and orientation of the chine 44 to reduce aerodynamic drag at cruise or in other flight or ground modes where the chine 44 negatively impacts aircraft operation.

The operation of the chine assembly will now be described with reference to FIG. 11. The chine 44 is preferably maintained in a stowed position 72 throughout most phases of flight such as during take-off, climb-out, cruise, approach and landing. However, the chine 44 may be configured to be deployable from the stowed position 72 to the deployed position 70 upon attainment of certain flight conditions. For example, in a method of operating the chine 44 that is movable between stowed and deployed positions, step 110 of the method may include detecting the angle of attack a of the wing 16 of the aircraft 10.

Detection of the wing 16 angle of attack $\alpha$ may be performed by any suitable instrumentation such as with on-board flight instrumentation or the angle of attack $\alpha$ may be determined analytically or in combination with a measured angle of attack $\alpha$. The angle of attack $\alpha$ may be continuously monitored during flight or may be periodically monitored throughout. As was indicated above, the nacelle may generate a nacelle wake 84 at high angles of attack $\alpha$ which may induce flow separation on certain areas of the upper surface of the wing 16 located generally downstream of the engine nacelle 30.

Figure 11:
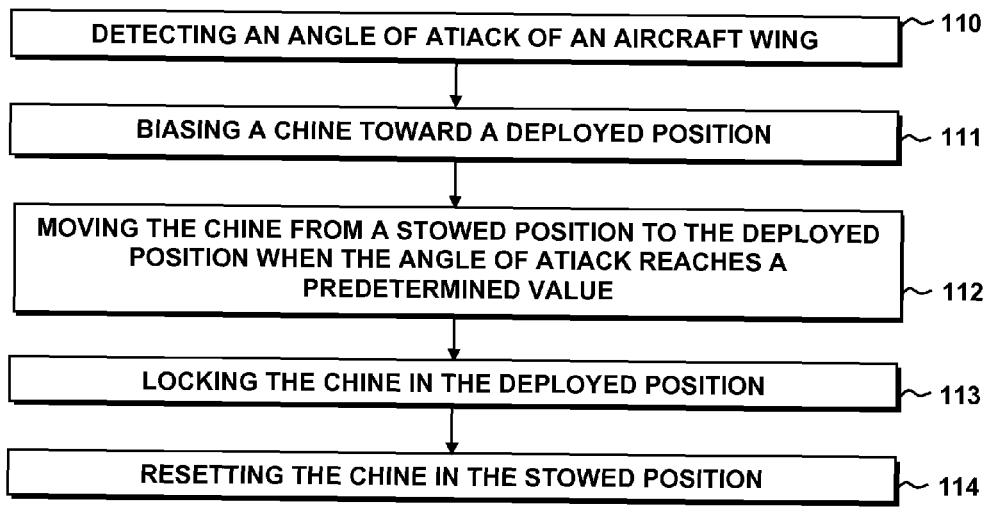
FIG. 11 is an illustration of an exemplary method of operating a chine.

Step 112 of the method illustrated in FIG. 11 may further comprise the step of moving the chine 44 from a stowed position 72 to a deployed position 70 upon attainment of a predetermined angle of attack $\alpha$. For example, the predetermined angle of attack $\alpha$ may be the angle of attack $\alpha$ where flow separation may start occurring or when stall is imminent. In this regard, the chine 44, in the deployed position 70, may generate a vortex 46 at such high angles of attack.

The vortex 46 generated by the deployed chine 44 preferably flows upwardly over the leading edge 18 of the wing 16 and along the wing upper surface 22 wherein the chine 44 effectively blocks inboard expansion of the nacelle wake 84 generated. Furthermore, the chine 44 may act to pull or limit the outboard expansion of the nacelle wake 84 and thereby effectively limit the width along which the nacelle wake 84 expands. In this regard, the retractable chine assembly of the present disclosure may delay flow separation and delay stall. The retractable chine assembly may improve maximum lift capability of the aircraft 10 due to its interaction with the nacelle wake 84 and boundary layer 48 of the wing upper surface 22.

The above description is given by way of example and not limitation. Given the above disclosure, one skilled in the art could devise variations that are within the scope and spirit of the embodiments disclosed herein. Furthermore, the various features of the embodiments disclosed herein can be used alone or in any varying combinations with each other and are not intended to be limited to the specific combinations described herein. Thus, the scope of the claims is not to be limited by the illustrated embodiments.

What is claimed is:

1. A retractable chine assembly for an aircraft including an engine nacelle and a wing having a wing upper surface, the chine assembly comprising:
   at least one chine hingedly mounted on an inboard side of the engine nacelle;
   wherein:
   the chine is configured to be movable between stowed and deployed positions;
   the chine generating a vortex passing over the wing upper surface and interacting with a wake generated by the nacelle in a manner increasing wing lift.

2. The retractable chine assembly of claim 1 wherein:
   the chine is disposable against the engine nacelle when in the stowed position.

3. The retractable chine assembly of claim 1 wherein:
   the chine is sized and positioned such that the vortex delays wing flow separation.

4. The retractable chine assembly of claim 1 wherein:
   the engine nacelle has a side surface defining a contour;
   the chine being contoured to substantially match the contour of the side surface when the chine is in the stowed position.

5. The retractable chine assembly of claim 1 wherein:
   the aircraft wing defines an angle of attack;
   the chine being configured to be moved to the deployed position when the angle of attack reaches a predetermined level.

6. The retractable chine assembly of claim 1 further comprising:
   an actuating mechanism for moving the chine between the stowed and deployed positions;
   the actuating mechanism including at least one of the following: hydraulic actuator, pneumatic actuator, electromechanical actuator, shape memory alloy device.

7. An aircraft having a wing and an engine nacelle, comprising:
   a retractable chine assembly, including:
   at least one chine hingedly mounted on an inboard or outboard side of the engine nacelle;

wherein:
the chine is configured to be movable between stowed and deployed positions;
the chine generating a vortex passing over the wing upper surface and interacting with a wake generated by the nacelle in a manner increasing wing lift.

8. The aircraft of claim 7 wherein:
the chine is disposable against the engine nacelle when in the stowed position.

9. The aircraft of claim 7 wherein:
the wing is swept in at least one of rearwardly and forwardly swept directions.

10. The aircraft of claim 7 wherein:
the chine is sized and positioned such that the vortex delays wing flow separation.

11. The aircraft of claim 7 wherein:
the engine nacelle has a side surface defining a contour;
the chine being contoured to substantially match the contour of the side surface when the chine is in the stowed position.

12. The aircraft of claim 7 wherein:
the wing defines an angle of attack;
the chine being configured to be moved to the deployed position when the angle of attack reaches a predetermined level.

13. The aircraft of claim 7 wherein:
the aircraft has at least one leading edge device mounted adjacent the wing leading edge and being outwardly extendable therefrom;
the leading edge device being disposable against the wing;
the chine being configured to be movable from the stowed position to the deployed position when the leading edge device is extended outwardly from the wing by a predetermined amount.

14. The aircraft of claim 13 wherein:
the leading edge device being configured as an extendable slat;
the slat and wing collectively defining a slot therebetween when the slat is extended;
the chine being configured to be movable from the stowed position to the deployed position when the slat is extended.

15. The aircraft of claim 13 further comprising:
an actuating mechanism for moving the chine between the stowed and deployed positions;
the actuating mechanism including at least one of the following: hydraulic actuator, pneumatic actuator, electromechanical actuator, shape memory alloy device.

16. A method of operating a chine hingedly mounted to an engine nacelle of an aircraft having an a wing upper surface, comprising the steps of:
moving the chine between a deployed position and a stowed position;
generating a vortex using the chine; and
passing the vortex over the wing upper surface and interacting with a wake generated by the engine nacelle in a manner increasing wing lift.

17. The method of claim 16 wherein the aircraft has a wing defining an angle of attack, the method further comprising the step of:
detecting the angle of attack; and
moving the chine from the stowed position to the deployed position when the angle of attack reaches a predetermined level.

18. The method of claim 16 further comprising the step of:
biasing the chine toward the deployed position;
deploying the chine;
locking the chine in the deployed position; and
resetting the chine in the stowed position.

* * * * *